(12) United States Patent
Sakai et al.

(10) Patent No.: US 11,267,372 B2
(45) Date of Patent: Mar. 8, 2022

(54) HOLDING MEMBER FOR SEAT AIR TUBE

(71) Applicants: AISIN SEIKI KABUSHIKI KAISHA, Kariya (JP); TOYOTA JIDOSHA KABUSHIKI KAISHA, Toyota (JP)

(72) Inventors: Makoto Sakai, Anjo (JP); Ryosuke Mizuno, Toyota (JP); Tomokazu Seki, Kariya (JP); Katsuya Nozue, Toyohashi (JP); Shunsuke Tanaka, Nisshin (JP); Kenji Hashimoto, Nisshin (JP)

(73) Assignees: AISIN SEIKI KABUSHIKI KAISHA, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 508 days.

(21) Appl. No.: 16/323,309

(22) PCT Filed: Aug. 4, 2017

(86) PCT No.: PCT/JP2017/028441
§ 371 (c)(1),
(2) Date: Feb. 5, 2019

(87) PCT Pub. No.: WO2018/030303
PCT Pub. Date: Feb. 15, 2018

(65) Prior Publication Data
US 2021/0289942 A1 Sep. 23, 2021

(30) Foreign Application Priority Data
Aug. 9, 2016 (JP) .............................. JP2016-156520

(51) Int. Cl.
*B60N 2/66* (2006.01)
*B60N 2/16* (2006.01)
(Continued)

(52) U.S. Cl.
CPC .............. *B60N 2/1665* (2013.01); *A47C 7/46* (2013.01); *B60N 2/665* (2015.04); *B60N 2/914* (2018.02); *B60N 2/976* (2018.02)

(58) Field of Classification Search
CPC ......... B60N 2/665; B60N 2/976; B60N 2/914
(Continued)

(56) References Cited

U.S. PATENT DOCUMENTS 3,613,671 A * 10/1971 Poor ...................... B60N 2/976
601/149
4,454,692 A * 6/1984 Ault .......................... E04B 5/40
174/486
(Continued)

FOREIGN PATENT DOCUMENTS

EP          2 607 157 A1    6/2013
JP       2010-172474 A      8/2010
(Continued)

OTHER PUBLICATIONS

International Search Report dated Oct. 3, 2017 in PCT/JP2017/028441 filed Aug. 4, 2017.

*Primary Examiner* — Rodney B White
(74) *Attorney, Agent, or Firm* — Oblon, McClelland, Maier & Neustadt, L.L.P.

(57) ABSTRACT

A seat device includes a holding member that holds an air tube and is located below a seat cushion. The holding member includes a base wall that defines a holding surface for the air tube, a locking portion that locks air tubes routed along the holding surface on the base wall, and a side wall extending in a routing direction of each of the air tubes.

13 Claims, 8 Drawing Sheets

(51) Int. Cl.
*B60N 2/90* (2018.01)
*A47C 7/46* (2006.01)

(58) Field of Classification Search
USPC .............................. 297/188.08–188.13, 217.3
See application file for complete search history.

(56) References Cited

U.S. PATENT DOCUMENTS

| | | | | | |
|---|---|---|---|---|---|
| 4,965,972 | A | * | 10/1990 | Domigan | E04B 5/48 174/494 |
| 6,053,880 | A | * | 4/2000 | Sleichter, III | A47C 7/40 297/217.3 |
| 6,323,421 | B1 | * | 11/2001 | Pawson | H02G 3/0418 174/503 |
| 6,682,494 | B1 | * | 1/2004 | Sleichter, III | A61H 23/02 297/217.3 X |
| 6,835,891 | B1 | * | 12/2004 | Herzog | H02G 3/0418 174/135 |
| 6,936,766 | B1 | * | 8/2005 | Galasso | H02G 3/128 174/481 |
| 7,077,467 | B2 | * | 7/2006 | Wenzler | B60R 16/0215 297/188.08 X |
| 7,598,881 | B2 | * | 10/2009 | Morgan | B60R 21/0152 297/217.3 X |
| 9,573,688 | B2 | * | 2/2017 | Pozzi | B64D 11/0648 |
| 9,919,803 | B2 | * | 3/2018 | Pozzi | B64D 11/0696 |
| 2003/0089515 | A1 | * | 5/2003 | Federspiel | H02G 3/0437 174/480 |
| 2006/0192417 | A1 | * | 8/2006 | Ellinger | B60R 21/0154 297/217.3 |
| 2017/0341551 | A1 | * | 11/2017 | Benthaus | B60N 2/5642 |

FOREIGN PATENT DOCUMENTS

| | | |
|---|---|---|
| JP | 2013-129245 A | 7/2013 |
| JP | 2013-129250 A | 7/2013 |
| JP | 2014-141133 A | 8/2014 |

* cited by examiner

HOLDING MEMBER FOR SEAT AIR TUBE

TECHNICAL FIELD

The present invention relates to a holding member for a seat air tube.

BACKGROUND ART

Some vehicle seat devices give massaging effects to an occupant sitting in a seat. A conventional seat device gives massaging effects by changing the support shape of a seat through expansion and contraction of airbags (bladders) provided in the seat or by pressing the seat covering from the inside with the airbags that are expanding and contracting.

Normally, in such a seat device, flexible air tubes are used to supply and discharge air to and from the airbags. Patent Document 1 discloses a structure in which a cable tie is used to fix air tubes (hoses) to the structural body (member frame) of the seat.

However, separate fixing of air tubes each configuring an air passage with a cable tie is troublesome. To cope with this problem, air tubes may be fixed to the structural body of the seat by inserting the air tubes into a large-diameter, tubular holding member in a bundled state. This facilitates routing of the air tubes and also protects the air tubes.

Nevertheless, inserting the air tubes into the tubular holding member requires time and efforts. In addition, when the bundle of the air tubes is thick, the layout flexibility decreases. Further, the air tubes are likely to interfere with one another in the tubular holding member. This causes each air tube to locally receive loads and may thus lower the reliability and durability.

PRIOR ART DOCUMENT

Patent Document

Patent Document 1: Japanese Laid-Open Patent Publication No. 2013-129245

SUMMARY OF THE INVENTION

Problems that are to be Solved by the Invention

It is an object of the present invention to provide a holding member for a seat air tube capable of routing seat air tubes in a more preferred manner.

Means for Solving the Problem

To solve the above-described problem, a holding member for a seat air tube according to a first aspect of the present invention is provided. The holding member includes a base wall that defines a holding surface for an air tube, a locking portion that locks air tubes routed along the holding surface on the base wall, and a side wall extending in a routing direction of each of the air tubes.

EMBODIMENTS OF THE INVENTION

A holding member for a pneumatic seat device having a seat-support function and a massage function and its air tubes according to an embodiment will now be described with reference to the drawings.

Figure 1:
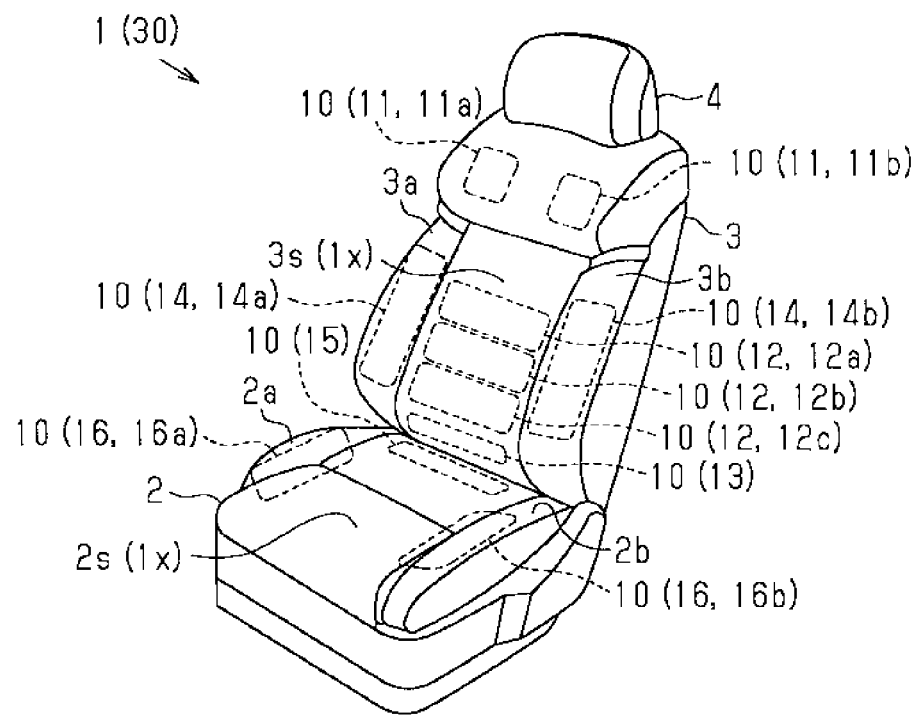
FIG. 1 is a perspective view of a vehicle seat provided with seat-support airbags.
Figure 2:
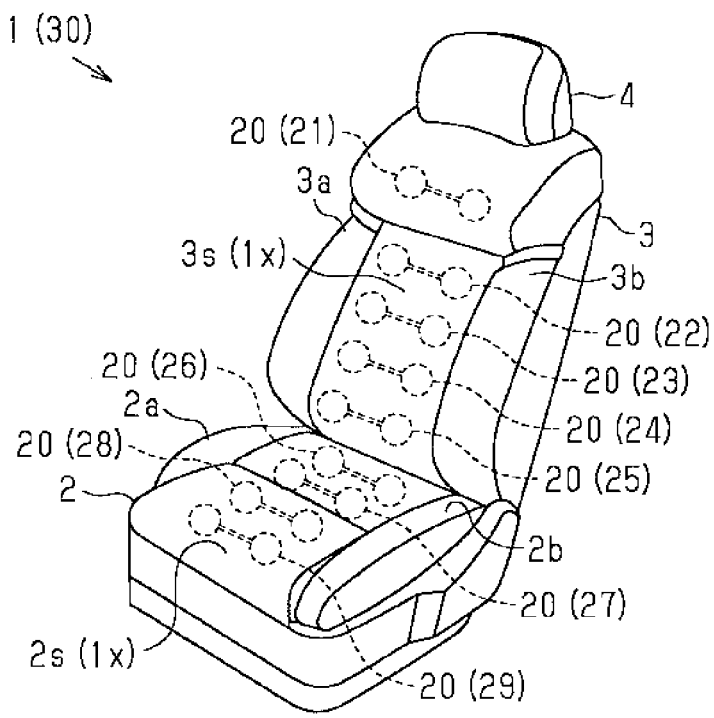
FIG. 2 is a perspective view of the vehicle seat provided with massage airbags.

As shown in FIGS. 1 and 2, a vehicle seat 1 includes a seat cushion 2 and a seatback 3, which is provided at the rear end of the seat cushion 2. The upper end of the seatback 3 is provided with a headrest 4.

The seatback 3 includes two side parts 3a and 3b that bulge frontward. The seat cushion 2 also includes two side parts 2a and 2b that bulge upward. This allows the seat 1 to ensure a favorable sitting posture of the occupant and keep the sitting posture of the occupant.

The seat 1 includes airbags 10 (11 to 16) that change the surface shape of the seat 1 by expanding and contracting inside the seat cushion 2 and the seatback 3. Further, the seat 1 includes airbags 20 (21 to 29) that press a seat covering 1x from the inside by expanding and contracting inside the seat cushion 2 and the seatback 3 in the same manner. This configures a seat device 30 capable of changing the support shape of the seat 1 and giving massaging (refreshing) effects to the occupant sitting in the seat 1.

More specifically, as shown in FIG. 1, the seat 1 includes independent seat-support airbags 11 (11a, 11b), 12 (12a to 12c), 13 provided in the seatback 3 at positions corresponding to the shoulder part (shoulder), the waist part (lumbar), and the lower end (back pelvis) of a backrest surface 3s, respectively. Further, independent seat-support airbags 14 (14a, 14b) are provided at positions corresponding to the two side parts 3a and 3b of the seatback 3, respectively. The seat cushion 2 also includes independent seat-support airbags 15 and 16 (16a, 16b) provided in the rear end (cushion pelvis) of a seating surface 2s and in the two side parts 2a and 2b, respectively.

As shown in FIG. 2, independent massaging (i.e., refreshing) airbags 21 to 25 are provided in the seatback 3 from the shoulder part (shoulder) to the waist part (lumbar) and the lower end (back pelvis) of the backrest surface 3s. The massaging airbags 21 to 25 are arranged in the vertical direction. Each massage airbag 20 has a structure in which two bag bodies spaced apart from each other in the width direction of the seat are connected to each other to integrally expand and contact. The seat cushion 2 also includes independent massage airbags 26 to 29 provided below the seating surface 2s. The massaging airbags 26 to 29 are arranged in the front-to-rear direction.

Figure 3:
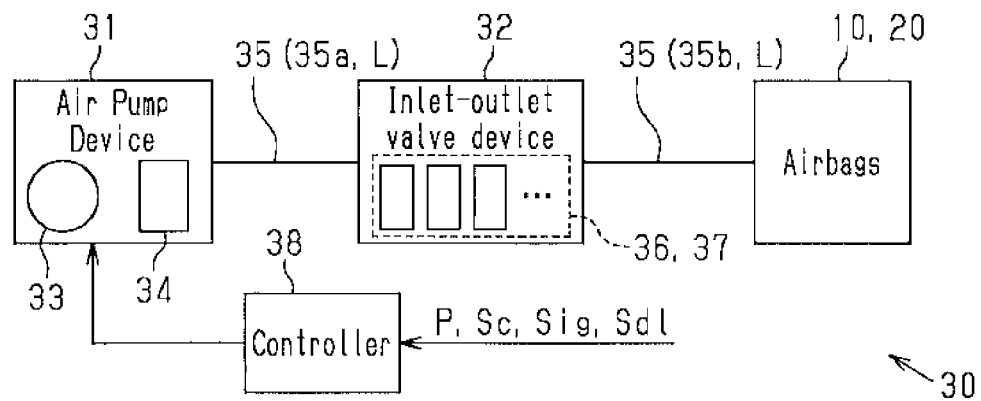
FIG. 3 is a schematic diagram of the configuration of a seat device.

As shown in FIG. 3, the seat device 30 includes an air pump device 31 that forcibly delivers air to each of the airbags 10, 20 and an inlet-outlet valve device 32 located between the airbags 10, 20 and the air pump device 31. For the air pump device 31, an electric pump that drives a pump mechanism 34 using a motor 33 as a drive source is used. In addition, the inlet-outlet valve device 32 is connected to the airbags 10, 20 and the air pump device 31 by flexible air tubes 35 (35a, 35b) made of plastic. That is, in the seat device 30, internal passages of the air tube 35 and the inlet-outlet valve device 32 define passages L that communicate with the airbags 10, 20 and the air pump device 31. Thus, the inlet-outlet valve device 32 has a structure in which inlet valves 36 and outlet valves 37 are located in the middle of the passages L.

The seat device 30 includes a controller 38 that controls activation of each inlet valve 36, each outlet valve 37, and the air pump device 31. More specifically, the controller 38 receives, for example, internal pressures P of the airbags 10, 20, an operation input signal Sc for an operation switch (not shown), an ignition signal Sig, and a door-lock signal Sd1. Based on these control signals, the controller 38 controls activation of each inlet valve 36, each outlet valve 37, and the air pump device 31 in order to expand and contract the airbags 10, 20.

The holding member for the air tubes provided in the seat device will now be described.

Figure 4:
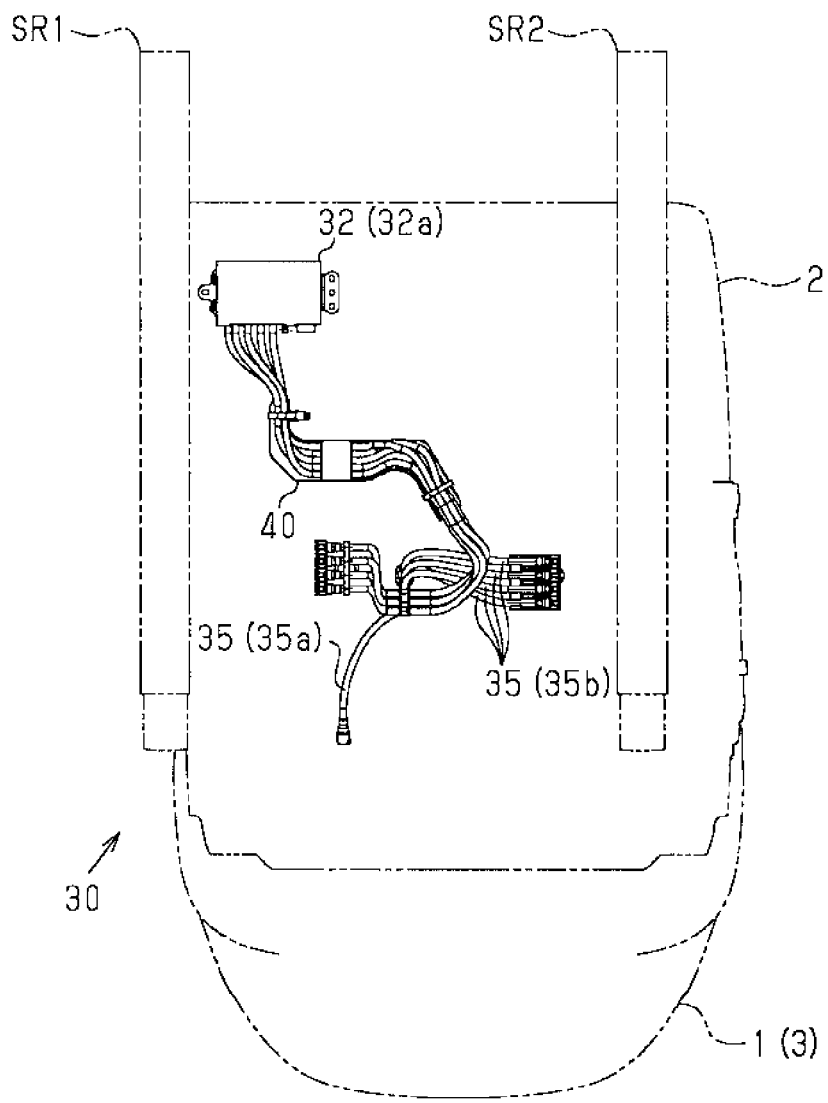
FIG. 4 is a bottom view of an inlet-outlet valve device and air tubes located below a seat cushion.
Figure 5:
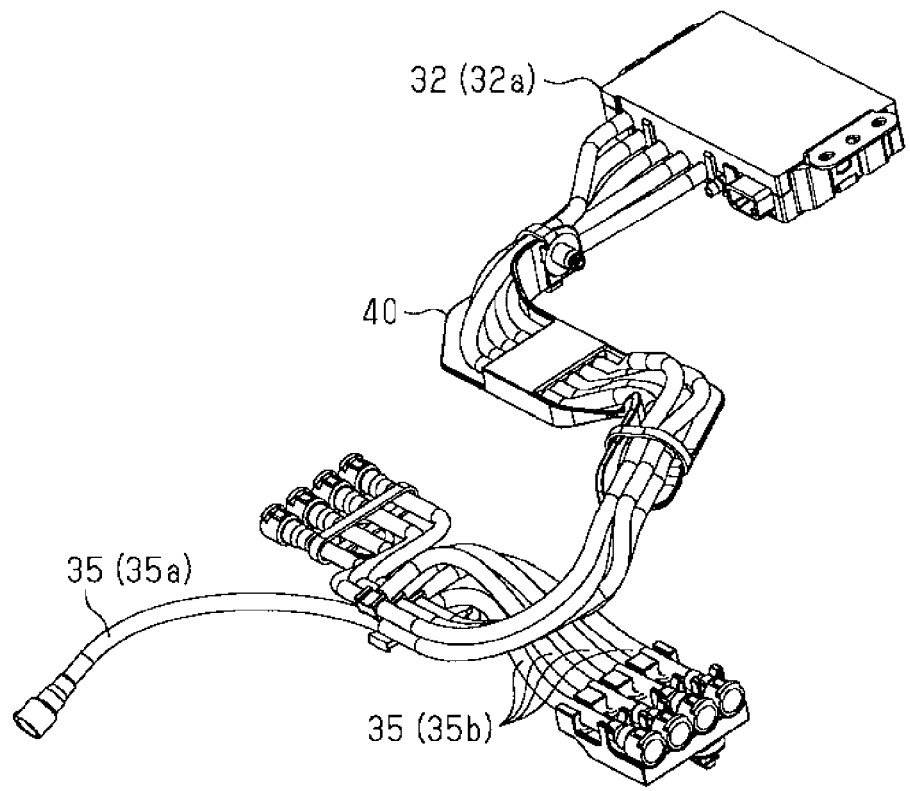
FIG. 5 is a perspective view of the inlet-outlet valve device, the air tubes, and a holding member.

As shown in FIGS. 4 and 5, the seat device 30 includes the inlet-outlet valve device 32 (32a) located below the seat cushion 2. The inlet-outlet valve device 32a is used to expand and contract the massage airbags 26 to 29 (refer to FIG. 2) incorporated in the seat cushion 2. Further, the seat device 30 includes a holding member 40 (case) located below the seat cushion 2. The holding member 40 holds the air tubes 35 (35a, 35b) connected to the inlet-outlet valve device 32a.

As shown in FIG. 4, the seat 1 is fixed on two (left and right) sliding rails SR1, SR2 located on the vehicle floor (not shown). In addition, the inlet-outlet valve device 32a is located at an end in the width direction of the seat in the proximity of the front end of the seat cushion 2 (upper end in FIG. 4), that is, located close to the first sliding rail SR1 (left side in FIG. 4). Further, each air tube 35 extends from the inlet-outlet valve device 32a in the width direction of the seat, that is, extends toward the second sliding rail SR2 (right side in FIG. 4), and extends toward the rear end of the seat cushion 2 (lower side in FIG. 4). The distal end of each air tube 35b extending from the inlet-outlet valve device 32a to each of the airbags 20 (26 to 29, refer to FIG. 2) of the seat cushion 2 is bifurcated. The holding member 40 holds the air tubes 35 in a bundle at the rear of the inlet-outlet valve device 32a (lower side in FIG. 4).

More specifically, as shown in FIGS. 6 to 13, the holding member 40 includes a base wall 41 defining a holding surface S that holds each air tube 35. Further, the holding member 40 includes a locking portion 42 that locks each air tube 35, which is routed along the holding surface S, on the base wall 41. Additionally, the holding member 40 includes side walls 43 (43a, 43b) extending in the routing direction of each air tube 35. The base wall 41, the locking portion 42, and the side walls 43 are integrally made of plastic.

Figure 6:
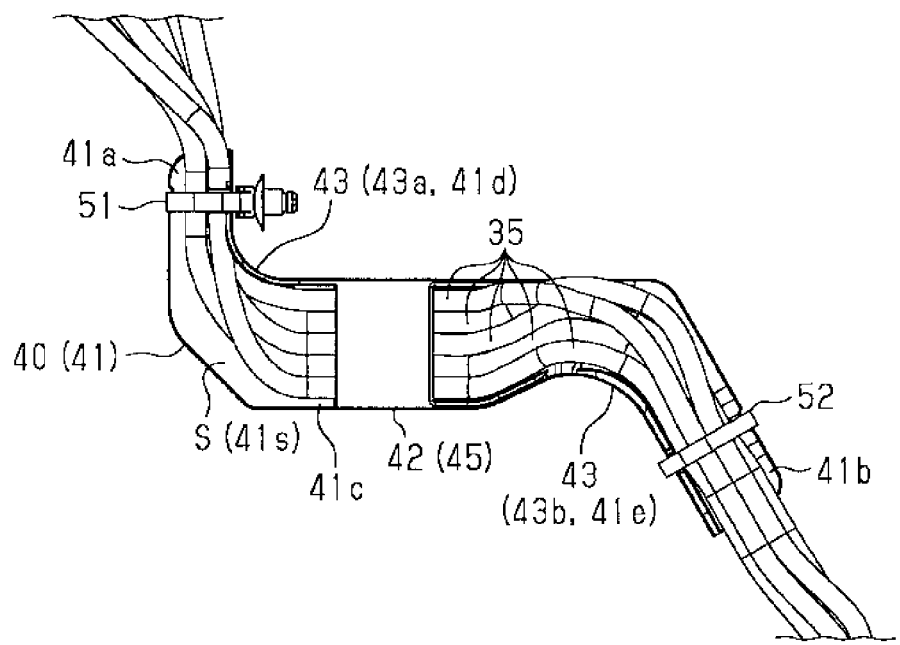
FIG. 6 is a bottom view of the air tubes and the holding member.
Figure 7:
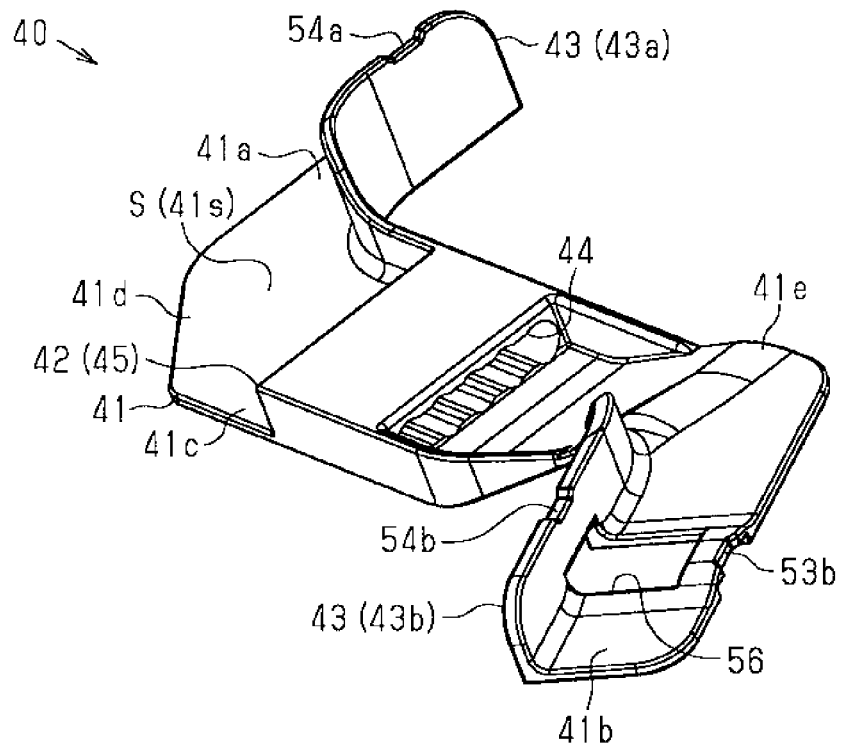
FIG. 7 is a perspective view of the holding member.
Figure 8:
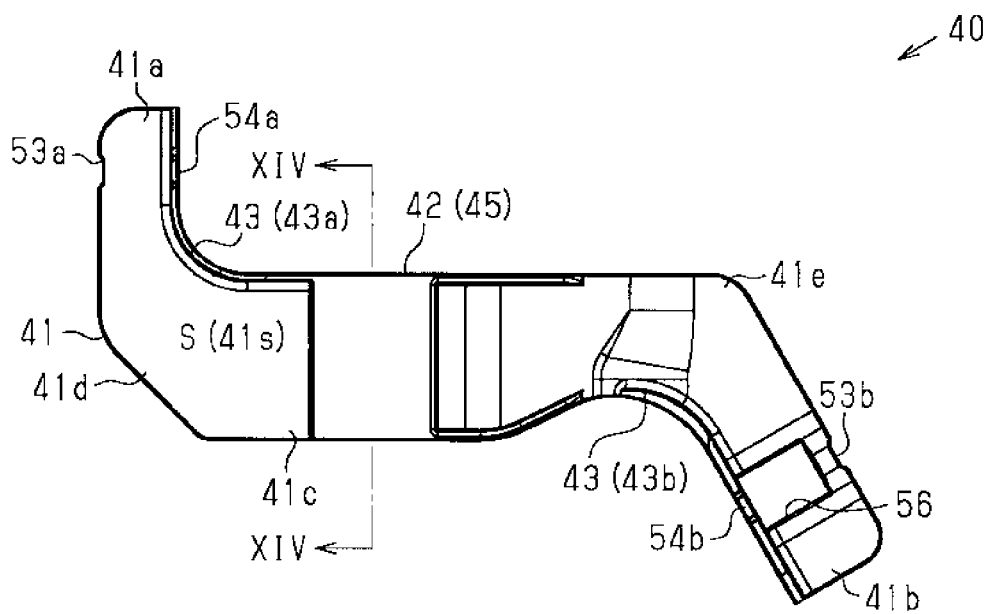
FIG. 8 is a bottom view of the holding member.
Figure 9:
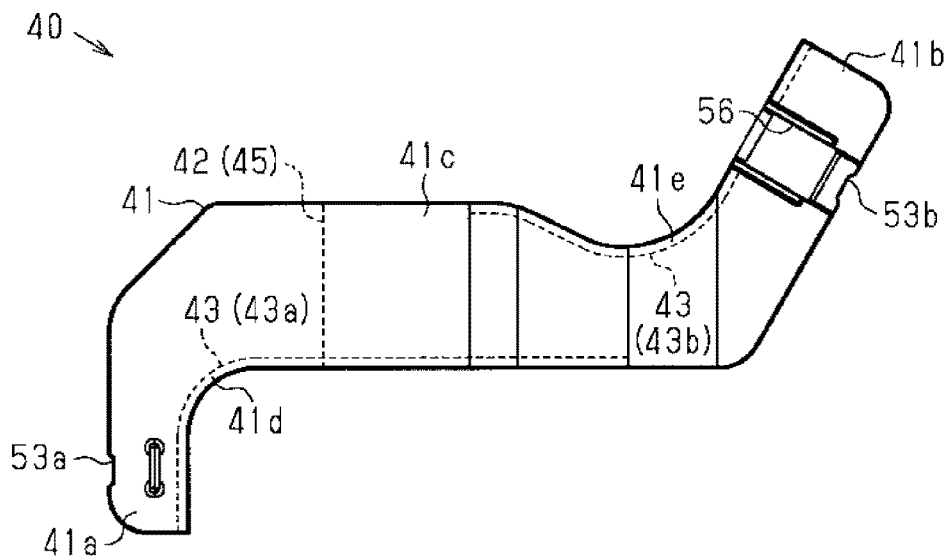
FIG. 9 is a top view of the holding member.
Figure 10:
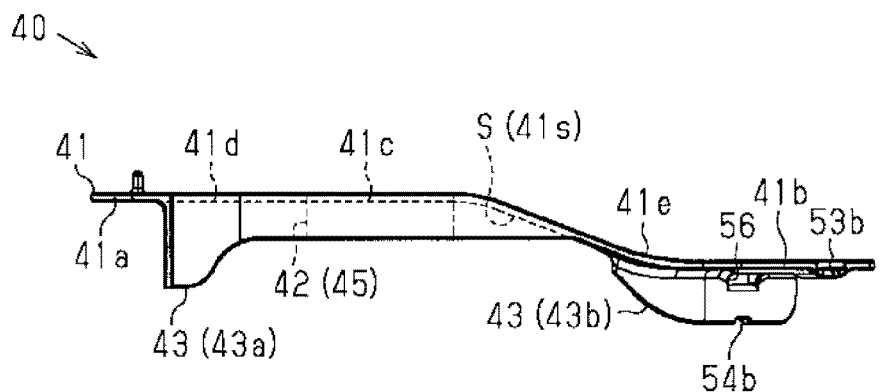
FIG. 10 is a first side view of the holding member.
Figure 11:
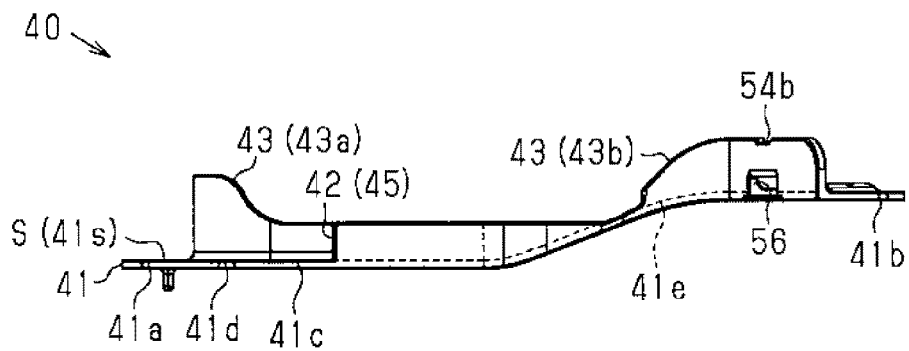
FIG. 11 is a second side view of the holding member.
Figure 12:
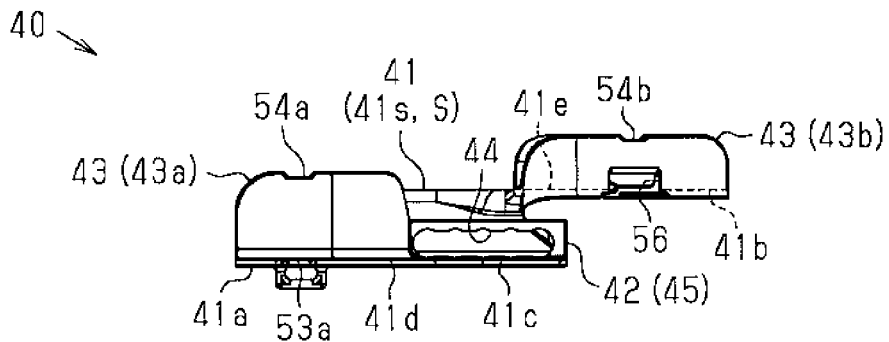
FIG. 12 is a third side view of the holding member.
Figure 13:
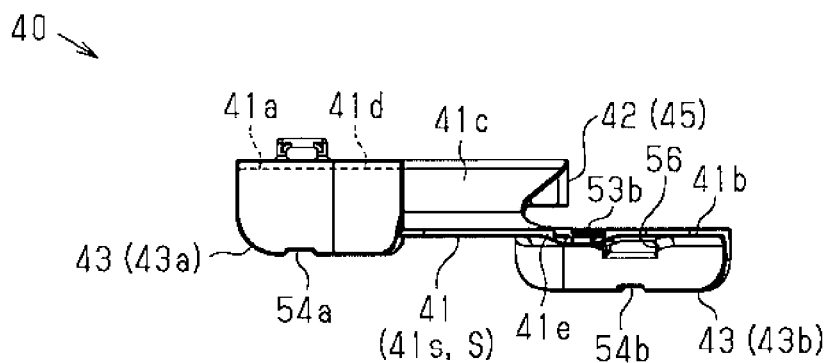
FIG. 13 is a fourth side view of the holding member.

As shown in FIGS. 7 to 9, the base wall 41 has the form of an elongated plate bent in a crank shape. More specifically, as shown in FIGS. 4 and 6, the base wall 41 includes a middle part 41c extending in the width direction of the seat (sideward direction in FIG. 6) with the holding member 40 located below the seat cushion 2. In this state, a first end 41a of the base wall 41 located in the proximity of the first sliding rail SR1 (left side in FIG. 6) extends from an end of the middle part 41c toward the front side of the seat 1 (upper side in FIG. 6). In addition, a second end 41b of the base wall 41 located in the proximity of the second sliding rail SR2 (right side in FIG. 6) extends from an end of the middle part 41c toward the rear side of the seat 1 (lower side in FIG. 6). The holding member 40 has a three-dimensional shape in which the middle part 41c and the second end 41b of the base wall 41 are uneven. The base wall 41 includes a first surface 41s facing downward (toward the front side of the plane of FIG. 6) with the holding member 40 located below the seat cushion 2. The first surface 41s defines the holding surface S for each air tube 35.

Further, as shown in FIGS. 6 to 8 and 12, the middle part 41c of the base wall 41 is provided with a tubular portion 45 that is flat and substantially quadrilateral. The tubular portion 45 protrudes from the holding surface S of the base wall 41. The tubular portion 45 has a hole 44 extending in a longitudinal direction of the middle part 41c (sideward direction in FIG. 6), that is, extending in the routing direction of each air tube 35. Inserting each tube 35, which is routed along the holding surface S, through the hole 44 of the tubular portion 45 causes the holding member 40 to lock each air tube 35 on the base wall 41.

Figure 14:
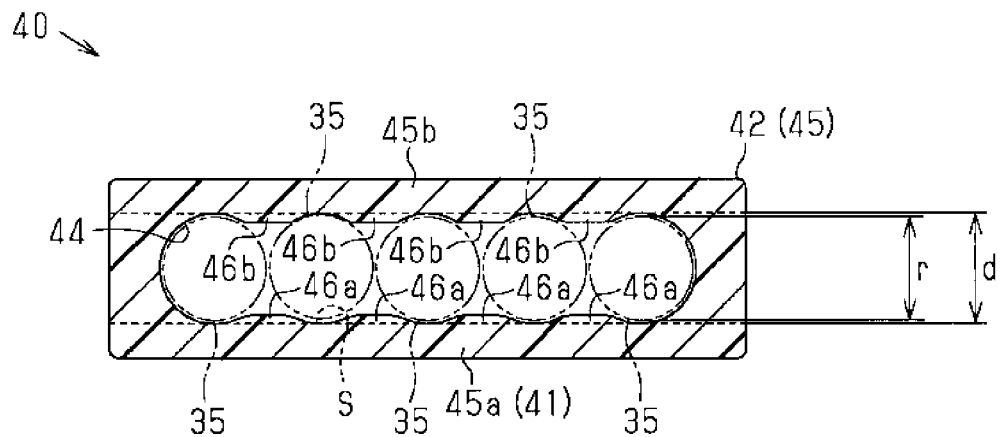
FIG. 14 is a cross-sectional view taken along line XIV-XIV in FIG. 8.
Figure 15:
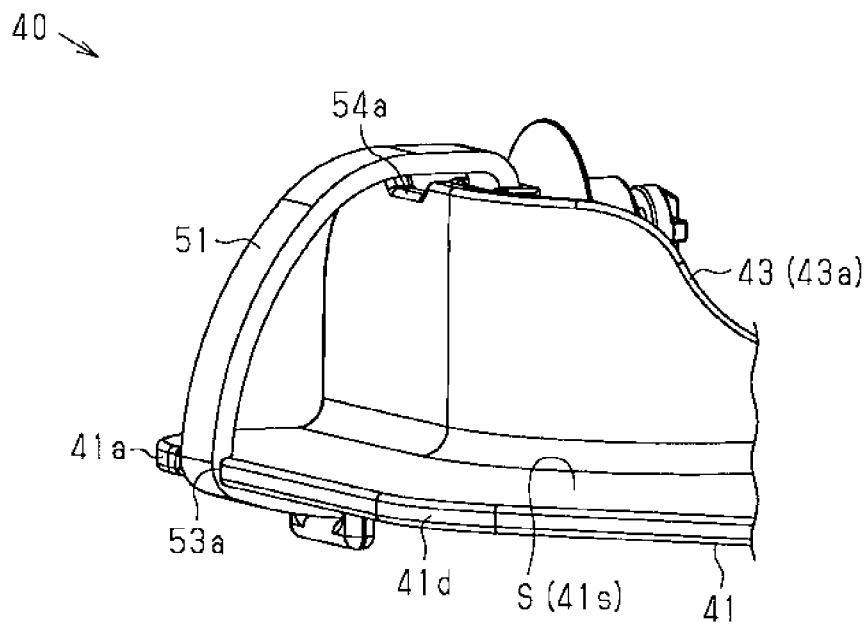
FIG. 15 is a perspective view of the proximity of a first end of the holding member.

More specifically, as shown in FIG. 14, the base wall 41 of the tubular portion 45 is configured as a first wall 45a. The distance d between the first wall 45a and a second wall 45b opposed to the first wall 45a is set to be substantially equal to the diameter r of each air tube 35 or slightly larger than the diameter r (d≈r). Thus, the air tubes 35 are arranged in parallel to one another along the holding surface S without being overlapped with one another in the hole 44 of the tubular portion 45, which serves as the locking portion 42.

The tubular portion 45 includes protuberances 46a protruding from the first wall 45a into the hole 44 and protuberances 46b each opposed to the corresponding protuberance 46a and protruding from the second wall 45b into the hole 44. Arranging each air tube 35 in the gap defined by the protuberances 46a, 46b allows each air tube 35 to be locked on the base wall 41 more stably.

In addition, as shown in FIGS. 6 to 8 and FIGS. 10 to 13, the holding member 40 includes a first side wall 43a and a second side wall 43b. The first side wall 43a is located at a corner 41d that connects the first end 41a of the base wall 41 to the middle part 41c. The second side wall 43b is located at a corner 41e that connects the second end 41b to the middle part 41c.

The direction that is orthogonal to the longitudinal direction of the base wall 41 extending in a cranked manner, that is, the direction that is orthogonal to the routing direction of each air tube 35 is defined as the width direction of the base wall 41. In this case, the first and second side walls 43a, 43b are located at ends of the corners 41d, 41e in the width direction, respectively. The first and second side walls 43a, 43b protrude from the holding surface S (upper side in FIGS. 11 and 12) of the holding member 40.

The first and second side walls 43a, 43b are respectively located on the inner sides of the corners 41d, 41e of the base wall 41, which are L-shaped. The first side wall 43a is located at an end of the base wall 41 in the width direction, which is located close to the front side of the seat 1 (upper side in FIG. 8). The second side wall 43b is located at an end of the base wall 41 in the width direction, which is located closer to the rear side of the seat 1 (lower side in FIG. 8). The first side wall 43a extends across the first end 41a and the middle part 41c in the longitudinal direction of the base wall 41. The second side wall 43b extends from the second end 41b to the position of the middle part 41c corresponding to the locking portion 42.

As shown in FIGS. 5 and 6, the air tubes 35, which are routed along the holding surface S of the base wall 41, are fixed to the holding member 40 by a cable tie 51 at a position corresponding to the first end 41a and fixed to the holding member 40 by a cable tie 52 at a position corresponding to the second end 41b.

More specifically, as shown in FIGS. 7 to 13, 15, and 16, the holding member 40 includes locking grooves 53a, 53b that are respectively shaped by cutting out the ends in the width direction of the first end 41a and the second end 41b of the base wall 41. The locking grooves 53a, 53b lock the cable ties 51, 52 to the holding member 40. Additionally, the first and second side walls 43a, 43b respectively include locking grooves 54a, 54b at positions corresponding to the locking grooves 53a, 53b. The cable tie 51 is engaged with the locking grooves 53a, 54a corresponding to the first end 41a of the base wall 41 and wound around the holding member 40. The cable tie 52 is engaged with the locking grooves 53b, 54b corresponding to the second end 41b of the base wall 41 and wound around the holding member 40. In this manner, the air tubes 35 are fixed to the holding member 40.

Figure 16:
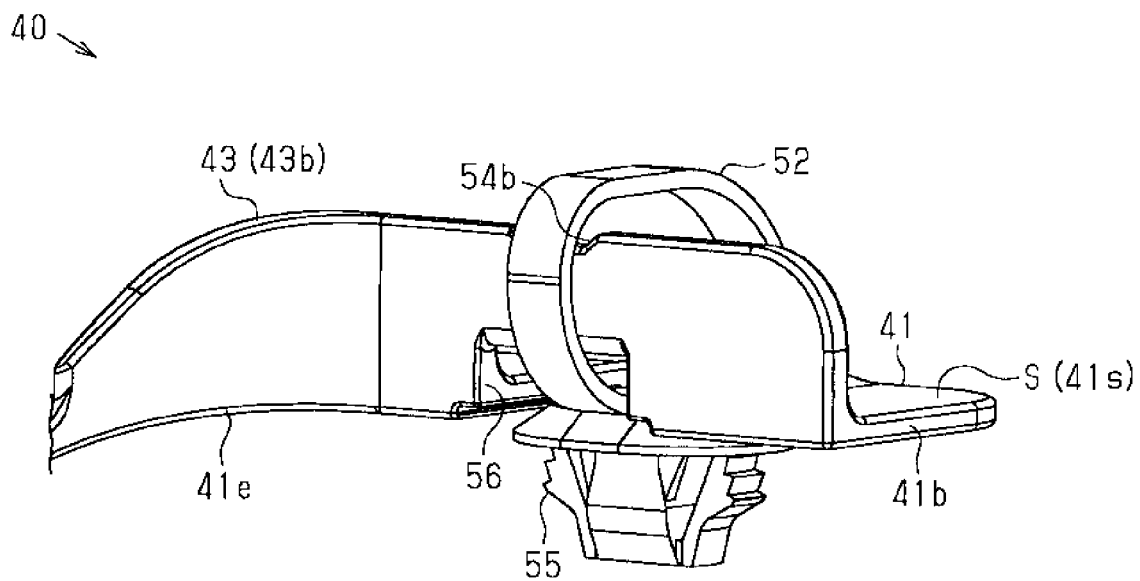
FIG. 16 is a perspective view of the proximity of a second end of the holding member.

Further, as shown in FIG. 16, the cable tie 52, which is wound around the holding member 40 at the position corresponding to the second end 41b of the base wall 41, includes a snap-fit 55 serving as a locking member. The holding member 40 has a hole 56 shaped by cutting out the second end 41b of the base wall 41 and the second side wall 43b in order to avoid interference with the snap-fit 55. The holding member 40 is fixed to the structural body (not shown) of the seat 1 together with the air tubes 35, which are routed along the holding surface S, by using the snap-fit 55.

The present embodiment has the following advantages.

(1) The seat device 30 includes the holding member 40, which holds the air tubes 35 and is located below the seat cushion 2. The holding member 40 includes the base wall 41, which defines the holding surface S holding the air tubes 35, the locking portion 42, which locks the air tubes 35 routed along the holding surface S on the base wall 41, and the side walls 43, which extend in the routing direction of each air tube 35. The above-described structure facilitates routing of each air tube 35. In addition, the base wall 41 and the side walls 43 protect each air tube 35. Further, routing each air tube 35 along the holding surface S reduces the thickness of each air tube 35 bundled by the holding member 40, that is, the length of each air tube 35 in a direction in which the air tube 35 protrudes from the holding surface S. This ensures high layout flexibility. Furthermore, the air tubes 35 can be routed so as to avoid interference with one another in the holding member 40. This eliminates loads acting locally on each air tube 35 and thus ensures high reliability and durability.

(2) The first surface 41s of the base wall 41, which faces downward with the holding member 40 located below the seat cushion 2, defines the holding surface S of each air tube 35. That is, when each air tube 35 is routed to the lower side of the seat cushion 2, a subject that is likely to interfere with each air tube 35 is normally located above or beside each air tube 35. Thus, the above-described structure facilitates the routing of each air tube 35 while properly protecting each air tube 35.

(3) The base wall 41 includes the tubular portion 45, which protrudes from the holding surface S. The tubular portion 45 has the hole 44, which extends in the routing direction of each air tube 35. In addition, each air tube 35, which is routed along the holding surface S, is inserted through the hole 44 of the tubular portion 45. Further, the holding member 40 causes the tubular portion 45 to act as the locking portion 42, thereby locking each air tube 35 on the base wall 41. The above-described structure allows each air tube 35 to be easily locked on the base wall 41 of the holding member 40 with a simple structure. Furthermore, routing of each air tube 35 is facilitated.

(4) The tubular portion 45, which serves as the locking portion 42, locks each air tube 35 on the base wall 41 such that the air tubes 35 are arranged in parallel to one another along the holding surface S. The above-described structure reduces the length of each air tube 35 in the direction in which the air tube 35 protrudes from the holding surface S. This ensures high layout flexibility. Additionally, the air tubes 35 are not overlapped with one another in the hole 44 of the tubular portion 45. This limits loads acting locally on each air tube 35 and thus ensures high reliability and durability.

(5) Each air tube 35 is routed along the holding surface S in a bent state. Further, the holding member 40 includes the first and second side walls 43a, 43b, which are located on the inner sides of the bent parts of the air tubes 35. The above-described structure allows the first and second side walls 43a, 43b to guide each air tube 35 in the routing direction. This further facilitates the routing of each air tube 35.

The above-described embodiment may be modified as described below.

In the above-described embodiment, the base wall 41, the locking portion 42, and the side walls 43 are integrally made of plastic. However, the material of the holding member 40 and the method for shaping the holding member 40 may be changed.

In the above-described embodiment, the base wall 41 has the form of an elongated plate bent in a crank shape. However, as long as the base wall 41 includes a surface defining the holding surface S of each air tube 35, the base wall 41 may have any shape.

In the above-described embodiment, the first surface 41s of the base wall 41, which faces downward with the holding member 40 located below the seat cushion 2 together with each air tube 35, defines the holding surface S of each air tube 35. However, the holding member 40 does not have to be located below the seat cushion 2. Instead, the holding member 40 may be located in the seat cushion 2 or the seatback.

In the above-described embodiment, each side wall 43 is located on the inner side of the bent part of each air tube 35, which is routed along the holding surface S. Instead, each side wall 43 may be located at any position, for example, on the outer side of the bent part of each air tube 35. In order to guide each air tube 35 in the routing direction, each side wall 43 preferably includes a portion located on the inner side of the bent part of each air tube 35.

The above-described embodiment causes the tubular portion 45, which has the hole 44 extending in the routing direction of each air tube 35, to act as the locking portion 42, thereby locking each air tube 35 routed along the holding surface on the base wall 41. However, the structure of the locking portion 42 may be changed.

Figure 17:
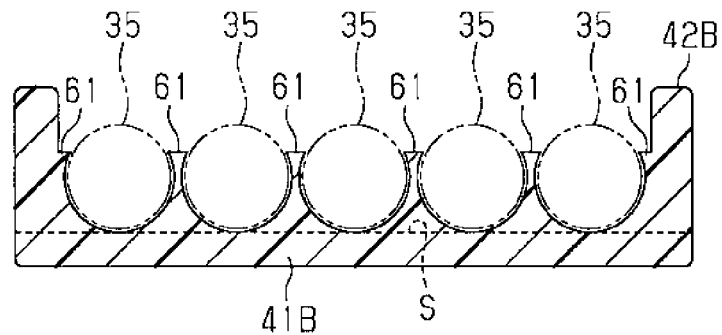
FIG. 17 is a cross-sectional view of a holding member, showing a locking portion of another example.

For example, a locking portion 42B may be provided as shown in FIG. 17. The locking portion 42B includes tabs 61 protruding from the holding surface S defined by a base wall 41B. Each air tube 35 is held between adjacent ones of the tabs 61. This allows each air tube 35 to be locked on the base wall 41B more easily.

Figure 18:
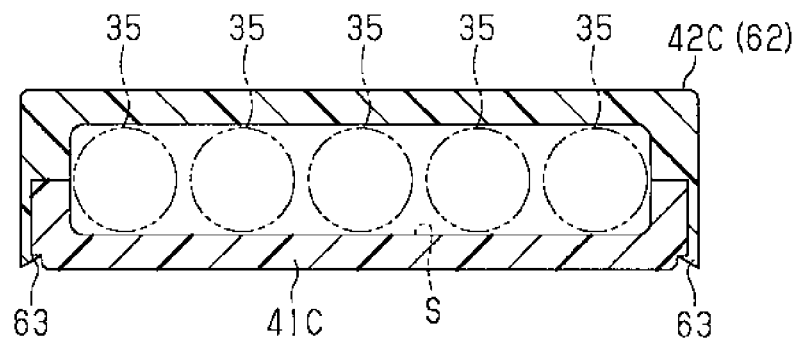
FIG. 18 is a cross-sectional view of a holding member, showing a locking portion of a further example.

Alternatively, for example, a locking portion 42C may be provided as shown in FIG. 18. The locking portion 42C includes a holder 62 that holds each air tube 35 with a base wall 41C by engaging with the base wall 41C. This structure facilitates and ensures locking of each air tube 35 on the base wall 41C.

The locking portion 42C is configured so that engagement tabs 63 provided on the holder 62 engage with the base wall 41C. This structure allows each air tube 35 to be locked on the base wall 41C more easily.

Figure 19:
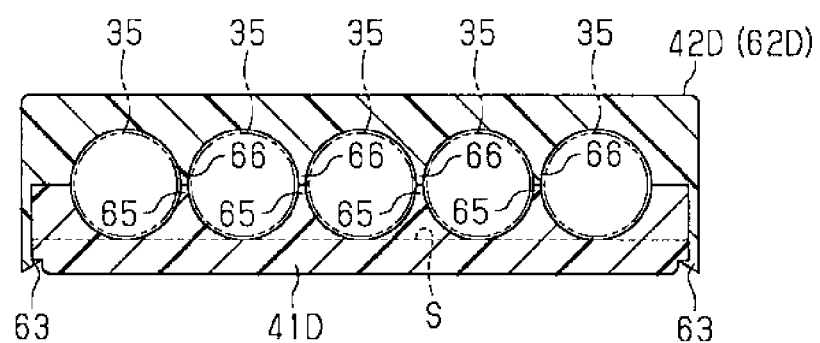
FIG. 19 is a cross-sectional view of a holding member, showing a locking portion of still another example

As another option, for example, a locking portion 42D may be provided as shown in FIG. 19. The locking portion 42D includes a base wall 41D and a holder 62D. The base wall 41D is provided with tabs 65 protruding from the holding surface S, and the holder 62D is provided with tabs 66 respectively opposed to the tabs 65. That is, the tabs 65, 66 may be configured so that each air tube 35 is held between the corresponding ones of the tabs 65, 66. This further ensures locking of each air tube 35 on the base wall 41D.

In the above-described embodiment, the tubular portion 45 serving as the locking portion 42 locks, on the base wall 41, the air tubes 35 arranged along the holding surface S. However, the air tubes 35 do not have to be locked in this manner. In addition, a structure in which a string or strip member such as a cable tie is used for the locking portion 42 is not excluded.

In the above-described embodiment, the holding member 40 is fixed to the structural body of the seat 1 by using the snap-fit 55, which is located on the cable tie 52 wound around the holding member 40. The structure of fixing the holding member 40 may be changed. In addition, a structure in which the holding member 40 is not fixed to the structural body of the seat 1 is not excluded.

The invention claimed is:

1. A holding member configured to hold air tubes for a seat, the holding member comprising:
a base wall that defines a holding surface for the air tubes when the air tubes are held by the holding member;
a locking portion that locks the air tubes routed along the holding surface on the base wall when the air tubes are held by the holding member; and
a side wall extending in a routing direction of each of the air tubes when the air tubes are held by the holding member, wherein
each of the air tubes is routed along the holding surface in a bent state when the air tubes are held by the holding member,
the side wall is located on an inner side of a bent part of each of the air tubes when the air tubes are held by the holding member, and
the holding member further comprises a securing member that secures the air tubes in a bundle to the holding member at the side wall when the air tubes are held by the holding member.

2. The holding member according to claim 1, wherein the locking portion locks each of the air tubes on the base wall with the air tubes arranged in parallel to one another along the holding surface when the air tubes are held by the holding member.

3. The holding member according to claim 1, wherein the locking portion includes a tubular portion having a hole that extends in the routing direction of each of the air tubes when the air tubes are held by the holding member.

4. The holding member according to claim 1, wherein
the locking portion includes tabs protruding from the base wall, and
the tabs are each configured so that each of the air tubes is held between adjacent ones of the tabs when the air tubes are held by the holding member.

5. The holding member according to claim 1, wherein the locking portion includes a holder that holds each of the air tubes between the locking portion and the base wall by engaging with the base wall when the air tubes are held by the holding member.

6. The holding member according to claim 1, wherein the base wall is located below a seat cushion with the holding surface facing downward.

7. A holding member configured to hold air tubes for a seat, the holding member comprising:
a base wall that defines a holding surface for the air tubes when the air tubes are held by the holding member, the base wall including
a middle part extending in a width direction of the seat,
a first end extending from a first end of the middle part toward a front side of the seat, and
a second end extending from a second end of the middle part toward a rear side of the seat;
a locking portion that locks the air tubes routed along the holding surface on the base wall when the air tubes are held by the holding member; and
a first side wall disposed at a first corner connecting the first end of the base wall to the middle part, and a second side wall disposed at a second corner connecting the second end of the base wall to the middle part, the first and second side walls extending in a routing direction of each of the air tubes when the air tubes are held by the holding member.

8. The holding member according to claim 7, wherein the locking portion locks each of the air tubes on the base wall with the air tubes arranged in parallel to one another along the holding surface when the air tubes are held by the holding member.

9. The holding member according to claim 7, wherein the locking portion includes a tubular portion having a hole that extends in the routing direction of each of the air tubes when the air tubes are held by the holding member.

10. The holding member according to claim 7, wherein
the locking portion includes tabs protruding from the base wall, and
the tabs are each configured so that each of the air tubes is held between adjacent ones of the tabs when the air tubes are held by the holding member.

11. The holding member according to claim 7, wherein the locking portion includes a holder that holds each of the air tubes between the locking portion and the base wall by engaging with the base wall when the air tubes are held by the holding member.

12. The holding member according to claim 7, wherein
each of the air tubes is routed along the holding surface in a bent state when the air tubes are held by the holding member, and the side wall is located on an inner side of a bent part of each of the air tubes when the air tubes are held by the holding member.

13. The holding member according to claim 7, wherein the base wall is located below a seat cushion with the holding surface facing downward.

\* \* \* \* \*